United States Patent
Files

[15] 3,678,611
[45] July 25, 1972

[54] FISHING TACKLE CARRIER

[72] Inventor: Charles R. Files, 998 Martin St., Glen Ellen, Calif. 95442

[22] Filed: Aug. 6, 1970

[21] Appl. No.: 61,632

[52] U.S. Cl. ............................43/26, 43/54.5 R, 206/16 R, 224/26 R
[51] Int. Cl. .........................................A01k 97/08
[58] Field of Search ..................43/26, 54.5 R; 224/26 R; 206/16 R, 16 E

[56] References Cited

UNITED STATES PATENTS

| | | | |
|---|---|---|---|
| 2,473,977 | 6/1949 | Tutton | 224/26 R |
| 2,816,390 | 12/1957 | Vaughn et al. | 43/26 |
| 3,410,018 | 11/1968 | Woolworth | 43/54.5 R |
| 2,138,190 | 11/1938 | Myers | 43/54.5 R UX |
| 1,110,150 | 9/1914 | Slavin et al. | 43/54.5 R UX |
| 824,495 | 6/1906 | Marbach | 206/16 R |

*Primary Examiner*—Samuel Koren
*Assistant Examiner*—Daniel J. Leach
*Attorney*—George B. White

[57] ABSTRACT

A fishing tackle carrier which has a floating container with removable caps at the ends and a compartment with a hinged cover containing superimposed trays for lures and other fishing tackle. The carrier remains buoyant even through the central compartment is open for access to the trays.

2 Claims, 7 Drawing Figures

Patented July 25, 1972
3,678,611
3 Sheets-Sheet 1
Fig. 1.
Fig. 2.
Fig. 3.
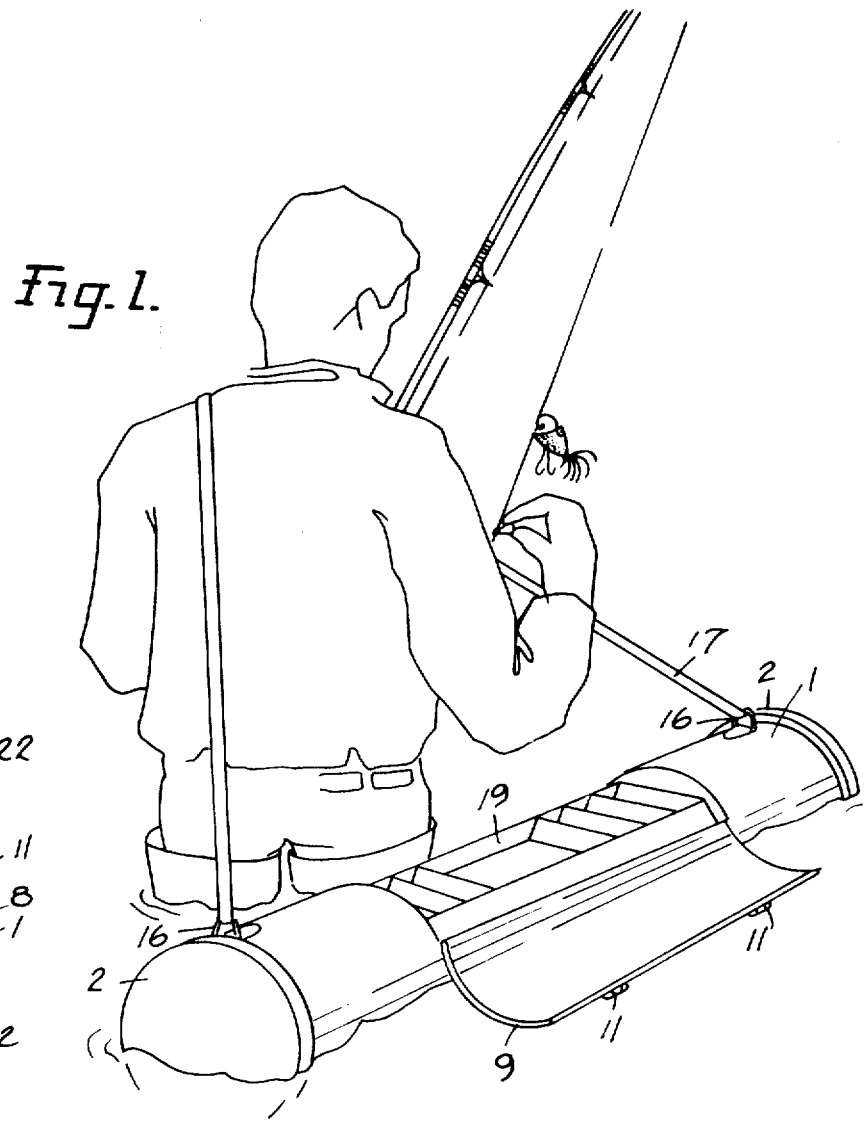
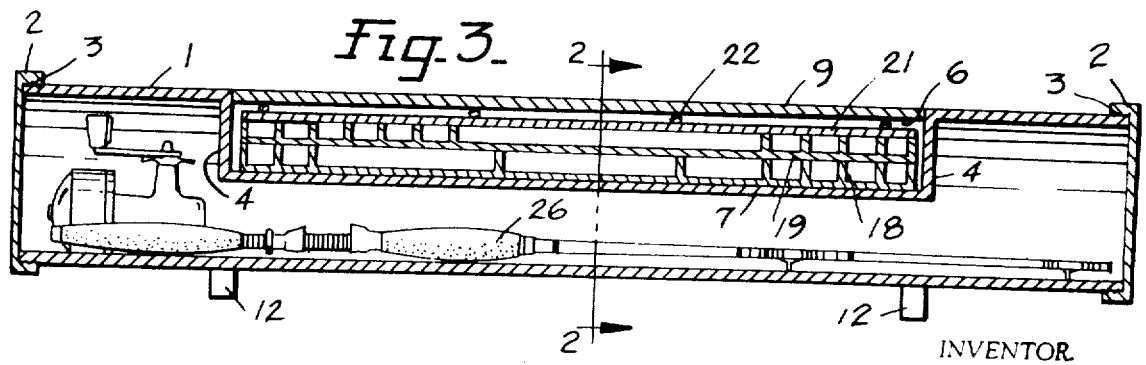
INVENTOR.
CHARLES R. FILES
BY Ginger B White
ATTORNEY

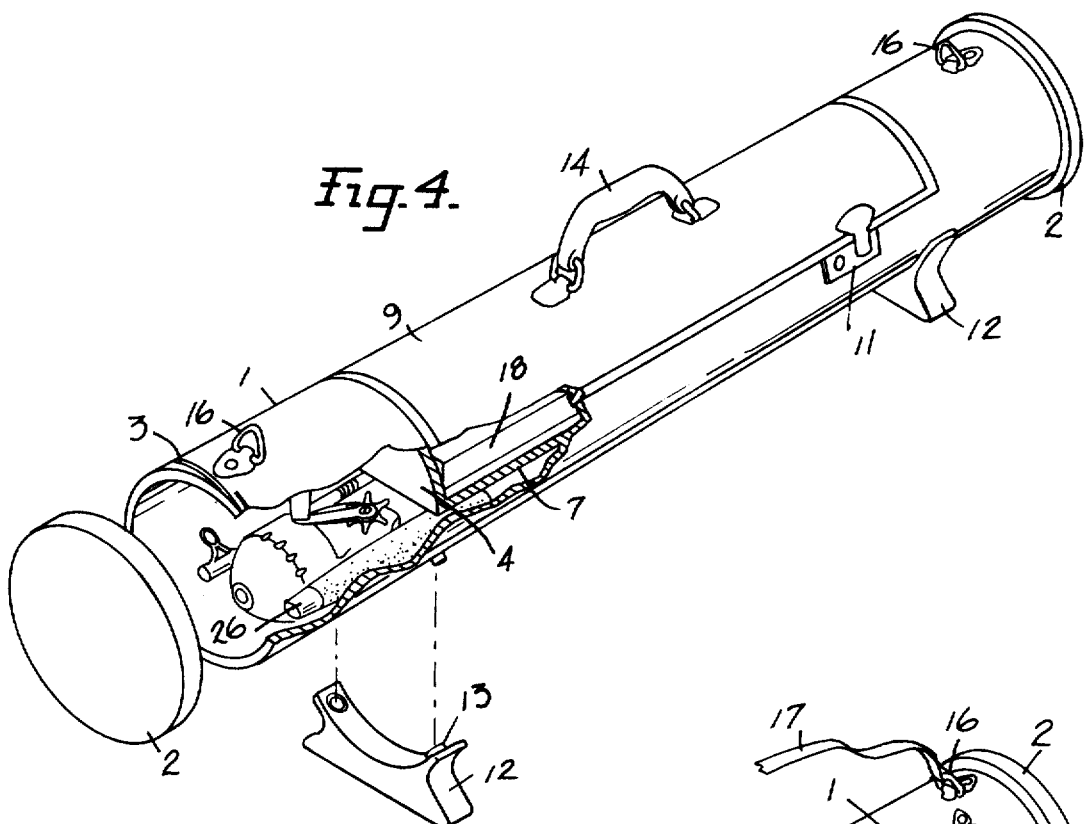
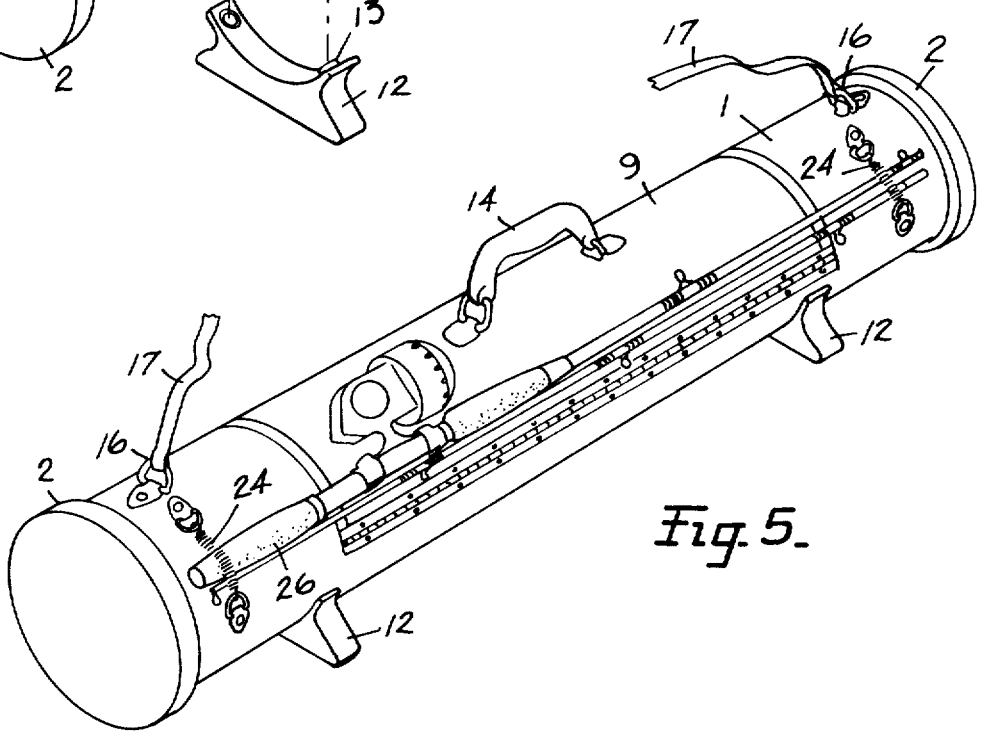

Patented July 25, 1972
3,678,611
3 Sheets-Sheet 3
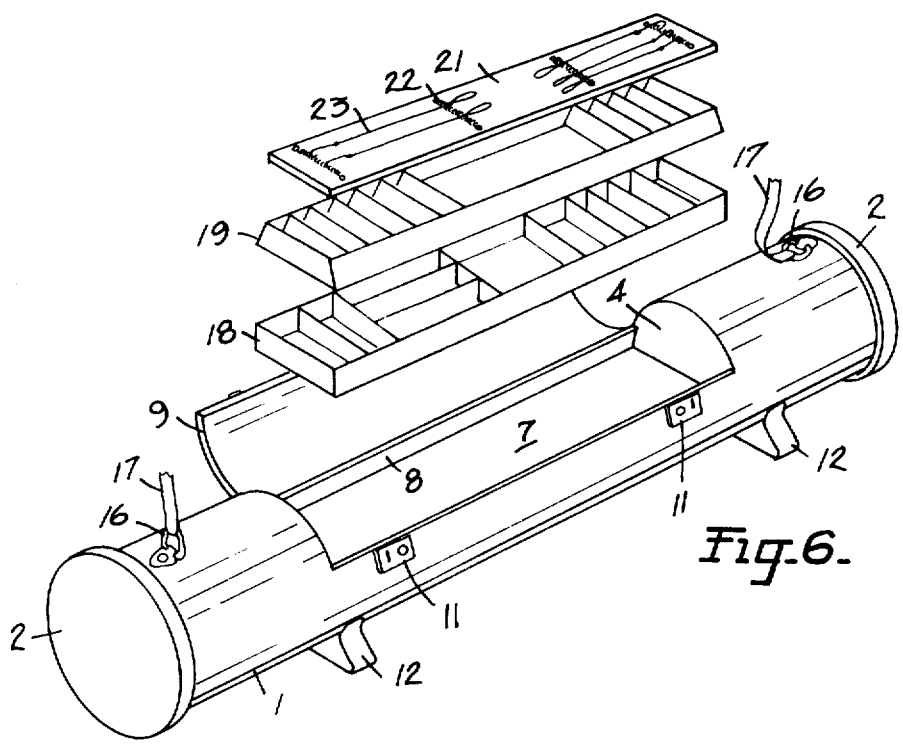
Fig.-6-
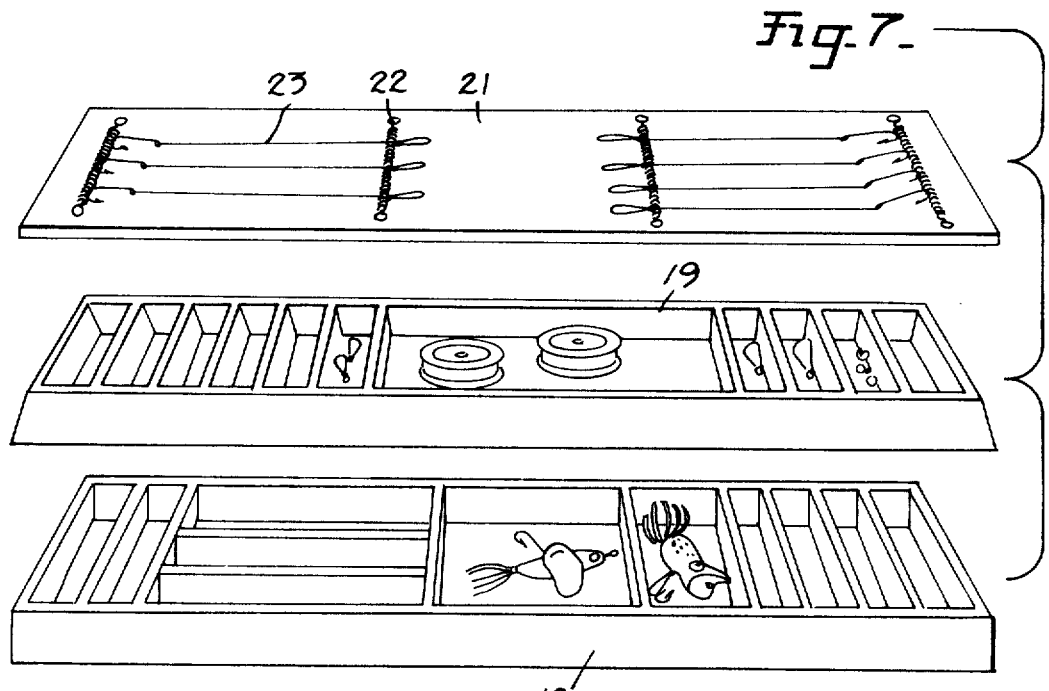
Fig.-7-
INVENTOR.
CHARLES R. FILES
BY George B. White
ATTORNEY

FISHING TACKLE CARRIER

BACKGROUND OF THE INVENTION

The problem of carrying fishing tackle conveniently was considered by prior patents, for instance, in the Tutton U.S. Pat. No. 2,473,977 there was provided a floating carrier which did not permit access to the interior while floating. In the Daviau U.S. Pat. No. 2,595,230, the fishing rods were mounted on a floating base and while access could be gained to the fishing rods, yet the chamber of the floating portion was wasted. In the Fleming U.S. Pat. No. 2,501,270, there were compartments shown for various accessories and a hinged top, but again no access could be gained to the various fishing tackle while the carrier was floating. In the Vaughn U.S. Pat. No. 2,816,390 there is provided fishing tackle and bait box which has an upper hinged portion for complete opening and has a smaller superimposed tray box which can be separately uncovered but it is not a carrier of the floating type.

The herein invention has the object of having a floating carrier which can be easily carried either by a handle or on a shoulder strap which floats in water and can be carried by the fisherman so that he can gain access to lures, bait or other accessories, yet remain buoyant.

BRIEF DESCRIPTION OF THE DRAWINGS

FIG. 1 is a perspective view of the carrier carried on a shoulder strap of a fisherman in water.

FIG. 2 is a cross-sectional view of the carrier, the section being taken on lines 2—2 of FIG. 3.

FIG. 3 is a longitudinal sectional view of the carrier, the section being taken on lines 3—3 of FIG. 2.

FIG. 4 is a perspective view of the carrier with one end cap removed for access to the fishing rod and showing the removable leg.

FIG. 5 is a perspective view showing the carrier with the fishing rod carried on the outside ready for use.

FIG. 6 is a perspective view of the carrier with the middle compartment open and the trays being shown in developed view.

FIG. 7 is an enlarged perspective view of the superimposed trays in the carrier.

DETAILED DESCRIPTION

The carrier includes a cylindrical case 1 on each end of which is a cap 2 which can be readily attached in a suitable manner such as by threads 3 on to the respective ends of the cylindrical case 1. The threads are so provided that when the caps 2 are in place the cylindrical case 1 is completely waterproof and it is sealed so that it is buoyant.

In the middle portion of the cylindrical case 1 the top wall of the case has inwardly extended walls 4 spaced from one another to form the ends of a pocket 6. The lower ends of the inward walls 4 are connected by a flat bottom 7. The pocket 6 so formed also has perpendicular curved walls 8 so as to completely define the pocket 6 all around and keep the interior of the cylindrical case 1 sealed so that when a hinged lid 9 on the top of the pocket 6 is opened the cylindrical case remains buoyant. The hinged lid 9 is curved over the cut away portion of the cylindrical case 1 so as to complement the circumference of the cylindrical case 1 when closed. The cylindrical case 1 is provided with suitable waterproof edges for sealing the pocket 6 when closed. Suitable latches 11 are provided for latching the hinged lid 9 in closed position.

The cylindrical case 1 is provided with detachable legs 12 which in the present form are snapped in place by suitable snaps 13 shown in FIG. 4 so as to facilitate detaching and attaching of the legs 12 as needed to the bottom portion of the cylindrical case 1, namely on the portion or side opposite to the lid 9.

On the top of the lid 9 is provided a suitable handle 14 for carrying the case in hand. Near each end is provided a ring or loop 16 through which a shoulder strap 17 is secured for the carrying of the case on the shoulders of the fisherman as shown in FIG. 1.

In the pocket 6 there are provided a pair of superimposed trays 18 and 19 divided by suitable partitions to accommodate extra lines, lures, and other accessories. The upper tray 19 is covered by a plate 21 which has suitable coil spring holders 22 for convenient holding of leaders and hooks 23 as shown in FIGS. 6 and 7.

Resilient or spring holders 24 on one side on the outside of the case 1 are provided to hold the fishing rod 26 ready for use.

As shown in FIG. 3 the fishing rod and reel are placed inside of the cylindrical case 1 and the various fishing accessories are placed in the trays 18 and 19 and on the plate 21 and when the lid 9 is closed the carrier can safely transport all the fishing tackle and accessories and it is completely buoyant. The fisherman can carry this case with him into the water and open the lid 9 and remove the trays 18, 19 or plate 21 for the purpose of changing leader and hook or lure and the like while the case 1 floats conveniently near the fisherman for easy manipulation.

I claim:

1. In a fishing tackle carrier,
   a buoyant case,
   detachable sealing closures at the ends of the case to permit access to the interior of the case for fishing tackle,
   a container pocket formed in the top of the case having ends, sides and bottom sealing the interior of said case,
   an openable lid on said pocket for access into said pocket at will while said case is floating,
   handle means for carrying said case,
   said handle means including a shoulder strap attached to said case on the same side where said lid is,
   said case being cylindrical,
   the longitudinal walls of said pocket complementing the cylindrical wall of said case,
   and said lid complementing the respective cut away periphery of said pocket.

2. The fishing tackle carrier specified in claim 1, and means on the exterior of said case for carrying a fishing rod adjacent said lid.

* * * * *